(12) United States Patent
Iwashita et al.

(10) Patent No.: US 8,283,880 B2
(45) Date of Patent: Oct. 9, 2012

(54) MOTOR DRIVE DEVICE WITH FUNCTION OF SWITCHING TO POWER REGENERATIVE OPERATION MODE

(75) Inventors: Yasusuke Iwashita, Minamitsuru-gun (JP); Shinichi Horikoshi, Minamitsuru-gun (JP); Takashi Harada, Minamitsuru-gun (JP); Shinichi Mizukami, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/152,573

(22) Filed: Jun. 3, 2011

(65) Prior Publication Data

US 2011/0298402 A1 Dec. 8, 2011

(30) Foreign Application Priority Data

Jun. 4, 2010 (JP) ................. 2010-128812

(51) Int. Cl.
*H02P 3/18* (2006.01)
(52) U.S. Cl. ........ 318/376; 318/375; 318/362; 318/807; 318/808; 318/809
(58) Field of Classification Search ............... 318/376, 318/375, 362, 807–811
See application file for complete search history.

(56) References Cited

U.S. PATENT DOCUMENTS
7,233,124 B2 * 6/2007 Takeoka et al. ............... 318/801

FOREIGN PATENT DOCUMENTS
JP 6-62584 3/1994
JP 8-228490 9/1996
JP 2008131851 A 6/2008

OTHER PUBLICATIONS

Blasko, V., "Power Conditions and Control of a Regenerative Brake," Industry Applications Conference, 1998, Thirty-Third IAS Annual Meeting, The 1998 IEEE, pp. 1504-1510, vol. 2.
Patent Abstracts of Japan, Figures, and Computer Translation of Japanese Unexamined Patent Publication (Kokai) No. 8-266059, published Oct. 11, 1996.

* cited by examiner

*Primary Examiner* — Walter Benson
*Assistant Examiner* — David Luo
(74) *Attorney, Agent, or Firm* — Drinker Biddle & Reath LLP

(57) ABSTRACT

A motor drive device including a converter for a power running operation and a power regenerative operation. The converter has power switching elements, a first power regenerative control unit for controlling the power switching elements in the power regenerative operation by using pulse width modulation signal whose pulse width changes with a value indicated by a command signal; a second power regenerative control unit for controlling the power switching elements in the power regenerative operation to generate respective power regenerative currents in a phase representing the maximum potential among three phases of a three-phase AC power supply and a phase representing the minimum potential among the three phases, and a power regenerative operation switching unit for switching a control of the power switching elements in the power regenerative operation between a control by the first power regenerative control unit and a control by the second power regenerative control unit.

6 Claims, 6 Drawing Sheets

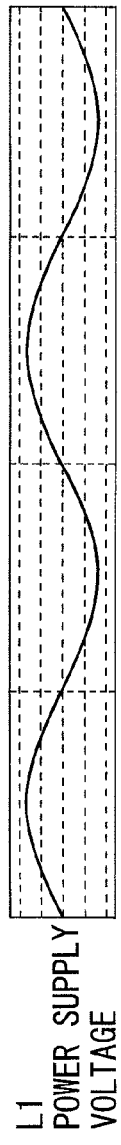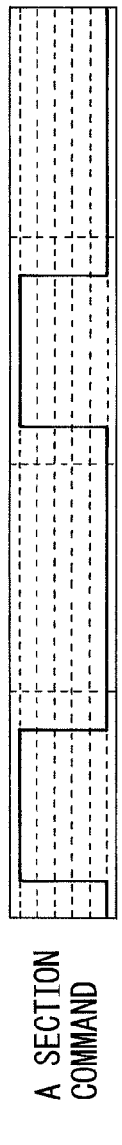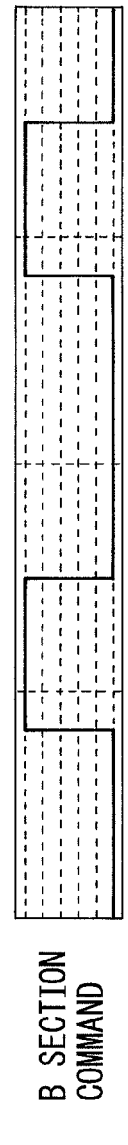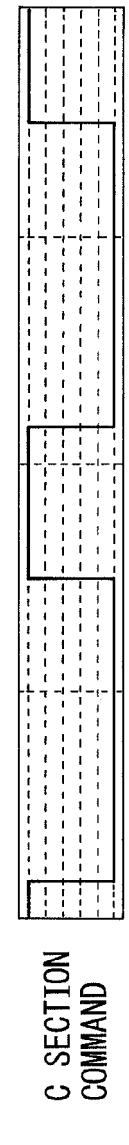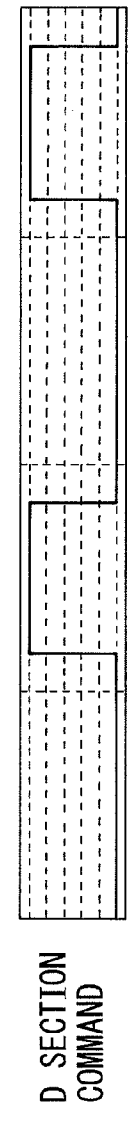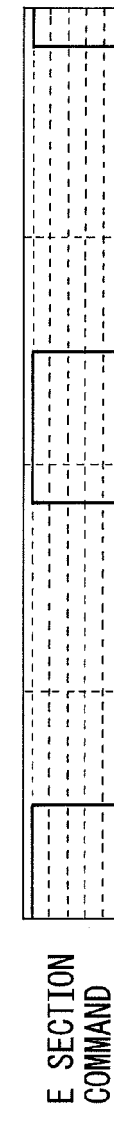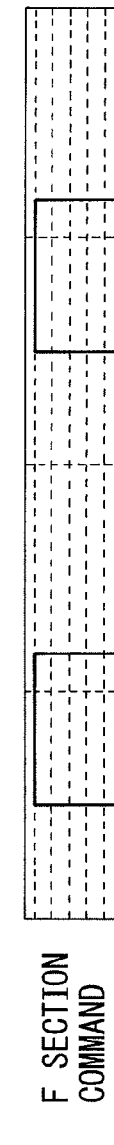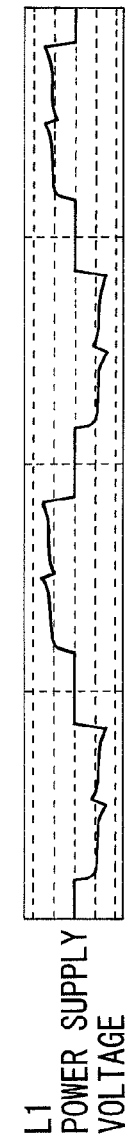
Fig. 3a  L1 POWER SUPPLY VOLTAGE
Fig. 3b  A SECTION COMMAND
Fig. 3c  B SECTION COMMAND
Fig. 3d  C SECTION COMMAND
Fig. 3e  D SECTION COMMAND
Fig. 3f  E SECTION COMMAND
Fig. 3g  F SECTION COMMAND
Fig. 3h  L1 POWER SUPPLY VOLTAGE

MOTOR DRIVE DEVICE WITH FUNCTION OF SWITCHING TO POWER REGENERATIVE OPERATION MODE

RELATED APPLICATION DATA

This application claims priority under 35 U.S.C. §119 and/or §365 to Japanese Application No. 2010-128812 filed Jun. 4, 2010, the entire contents of which is incorporated herein by reference.

BACKGROUND OF THE INVENTION

1. Field of the Invention

The present invention relates to a motor drive device comprising a converter for carrying out a power running operation for supplying power from a three-phase AC power supply to a three-phase AC motor and a power regenerative operation for returning energy generated by the three-phase AC motor to the three-phase AC power supply.

2. Related Art Statement

In a motor drive device driving a machine tool, an industrial machine, a robot and so on, a PWM (pulse width modulation) converter system, which converts a form of respective input currents to a substantially sinusoidal waveform by applying a PWM control carried out by power switching elements to AC/DC conversion for converting input AC power to DC power, is often used.

This PWM converter system has advantages in that harmonics included in the respective input currents to the PWM converter system can be reduced, in that respective output DC voltages from the PWM converter system can be changed, and so on. However, at the time of the power regenerative operation for returning energy generated by a motor to a power supply, such as the time of a deceleration control of the motor, heat generated by switching of the power switching elements in the PWM control is larger than in case of a power regeneration of a 120 degree current-carrying system, as stated below, and described in Japanese Examined Patent Publication (Kokai) No. 6-62584 (JP6-62584A), for example.

Therefore, conventionally, it is necessary to stop the PWM converter system in order to prevent overheating of the PWM converter system when the load of a converter used in the PWM converter system increases.

On the other hand, in the power regeneration of the 120 degree current-carrying system widely used in conventional power regeneration, only two power switching elements out of six power switching elements are turned on in order to generate respective power regenerative currents in a phase representing the maximum electric potential among three phases of the three-phase AC power supply and a phase representing the minimum electric potential among the three phases. The power switching elements used in this 120 degree current-carrying system generates less heat than in case of the PWM converter system, since the number of switching of the power switching elements used in the 120 degree current-carrying system is less than in case of the PWM converter system. However, the 120 degree current-carrying system has disadvantages in that there are large harmonics included in the respective input currents to the 120 degree current-carrying system resulting from respective pulse-like large currents, in that a sudden change of output DC voltage from the 120 degree current-carrying system affects a control of a motor used in the 120 degree current-carrying system and so on. Incidentally, Japanese Examined Patent Publication (Kokai) No. 8-228490 (JP8-228,490A) describes a converter which is operated in diode rectification mode at the time of the power running operation in order to eliminate a loss of switching and is controlled by a PWM signal only at the time of the power regenerative operation.

Therefore, the object of the present invention is to provide a motor drive device capable of continuing an operation even in the case of an excessive load of a converter in which the PWM control of the converter is carried out at the time of the power regenerative operation.

SUMMARY OF THE INVENTION

According to the present invention, there is provided a motor drive device comprising a converter for carrying out a power running operation for supplying power from a three-phase AC power supply to a three-phase AC motor and a power regenerative operation for returning energy generated by the three-phase AC motor to the three-phase AC power supply, wherein the converter has: power switching elements; a first power regenerative control unit for controlling an on/off action of the power switching elements at the time of carrying out the power regenerative operation by using a pulse width modulation signal whose pulse width changes in accordance with a value indicated by a command signal; a second power regenerative control unit for controlling the on/off action of the power switching elements at the time of carrying out the power regenerative operation in order to generate respective power regenerative currents in a phase representing the maximum electric potential among three phases of the three-phase AC power supply and a phase representing the minimum electric potential among the three phases; and a power regenerative operation switching unit for switching a control of the on/off action of the power switching elements at the time of carrying out the power regenerative operation between a control carried out by the first power regenerative control unit and a control carried out by the second power regenerative control unit.

For example, the power regenerative operation switching unit selects the control carried out by the first power regenerative control unit while parameter representing load value of the converter at the time of carrying out the power regenerative operation is equal to or less than a certain value, and switches to the control carried out by the second power regenerative control unit when the parameter exceeds the certain value.

For example, the parameter may represent temperature of the converter.

Further, the parameter represents an estimated value of load of the power switching elements determined by currents flowing between the three-phase AC power supply and the converter.

The motor drive device can continue the operation by switching the control of the on/off action of the power switching elements from the control carried out by the first power regenerative control unit, i.e., a PWM control to the control carried out by the second power regenerative control unit, i.e., a 120 degree current-carrying control (in case of three-phase) which generates less heat than in case of the PWM control.

BRIEF DESCRIPTION OF THE DRAWINGS

The objects, features and advantages of the present invention will become more apparent from the following description of the preferred embodiments in connection with the accompanying drawings, wherein:

FIGS. 3a to 3h are waveform diagrams explaining a power regenerative control carried out by a 120 degree current-carrying system;

DETAILED EXPLANATION

Figure 1:
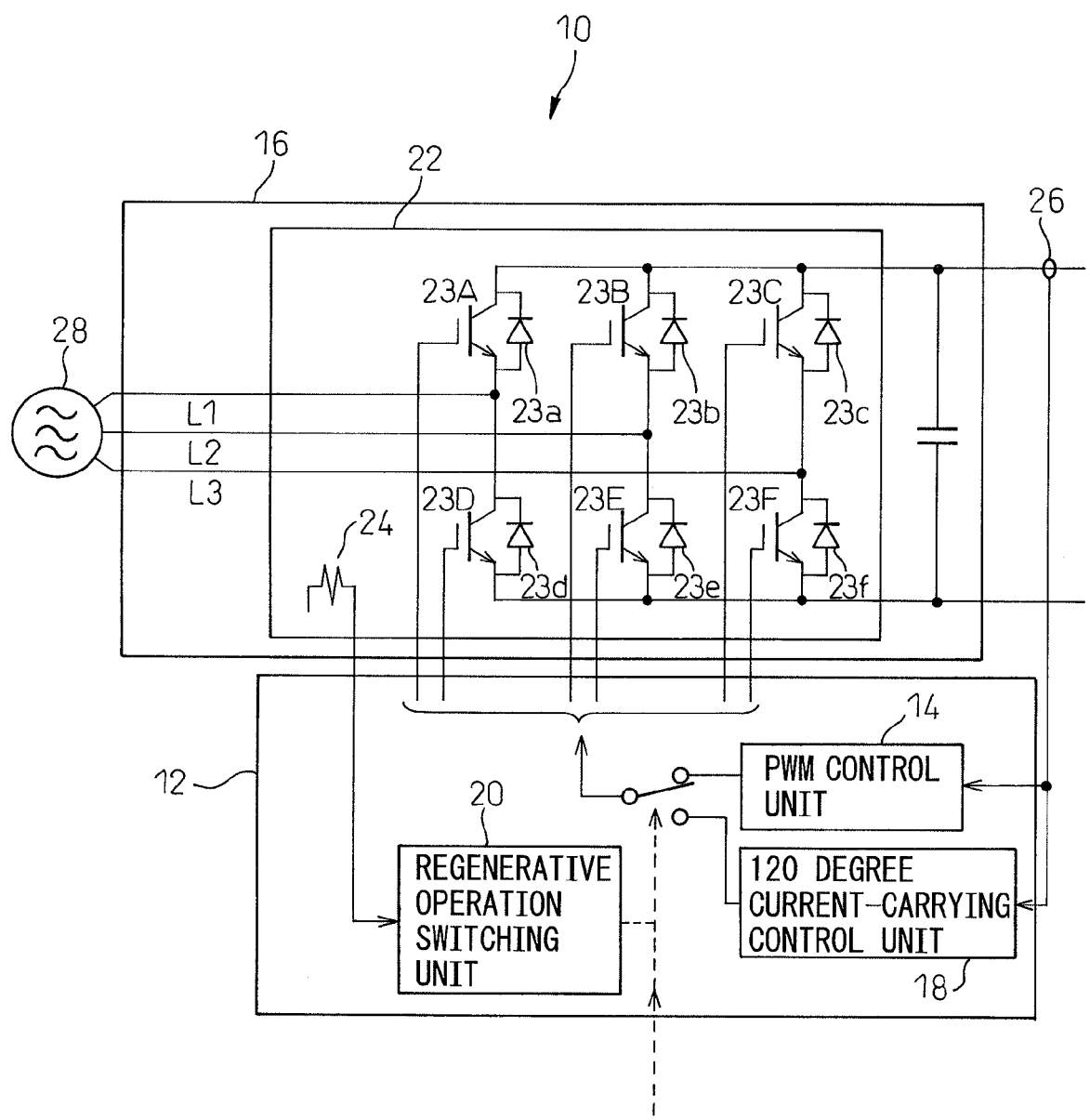
FIG. 1 is a diagram showing a configuration of a motor drive device according to a first embodiment of the present invention.

The embodiments of the present invention are described below, in detail, with reference to the accompanying drawings. In the drawings, identical or similar components are denoted by common reference numerals.

Referring to the drawings, FIG. 1 is a diagram showing a configuration of a motor drive device according to a first embodiment of the present invention. The device includes a converter (AC/DC conversion unit) which is connected to an inverter (DC/AC conversion unit) connected to a three-phase AC motor. The inverter and the three-phase AC motor are not shown in the figures.

In FIG. 1, converter 10 is composed of main circuit unit 16 and control unit 12. PWM control unit 14 in control unit 12 generates a PWM signal, which is used for a PWM (pulse width modulation) control of transistors 23A to 23F as power switching elements. Transistors 23A to 23F are respectively connected to six rectifier diodes 23a to 23f in main circuit unit 16 in parallel and in an inverse direction. The PWM control is described below with reference to FIG. 2. MOSFET, (Metal Oxide Semiconductor Field Effect Transistor), IGBT (Insulated Gate Bipolar Transistor) and so on can be used as the power switching element. 120 degree current-carrying control unit 18 generates a control signal, which is used for a power regenerative control in a 120 degree current-carrying system as stated below with reference to FIG. 3. Temperature detection element 24 measures temperature of heat sink 22 on which rectifier diodes 23a to 23f and transistor 23A to 23F are provided, as temperature of converter 10, more specially, temperature of the power switching elements. Regenerative operation switching unit 20 estimates the load status of the power switching elements from the temperature detected by temperature detection element 24, as stated below with reference to FIGS. 4 and 5. If regenerative operation switching unit 20 determines the necessity of switching, based on the result of such an estimation, regenerative operation switching unit 20 switches the control signal supplying to transistor 23A to 23F from the PWM signal supplied from PWM control unit 14 to the control signal supplied from 120 degree current-carrying control unit 18.

Figure 2A:
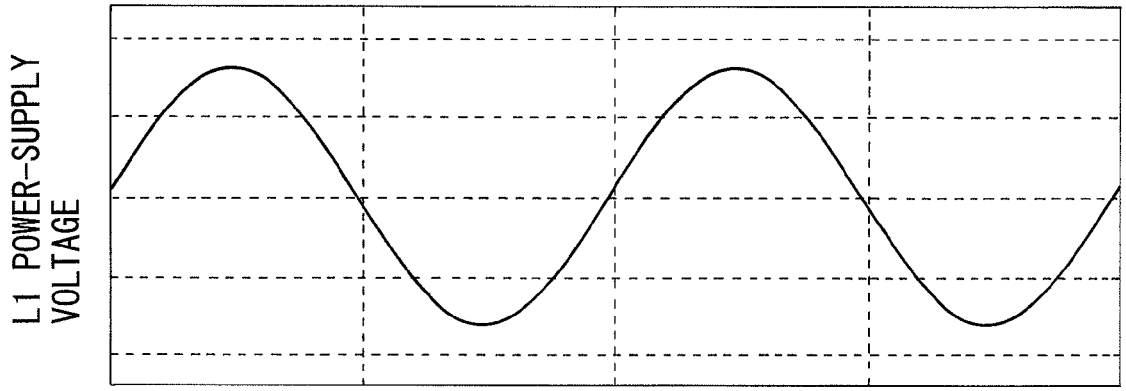
FIGS. 2a to 2c are waveform diagrams explaining a PWM control.
Figure 2B:
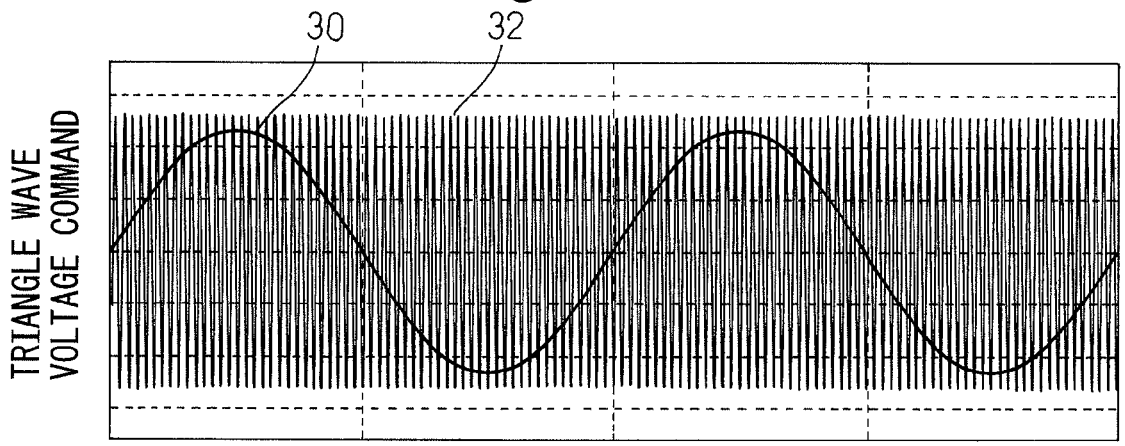

FIG. 2 is a waveform diagram explaining the PWM control carried out by PWM control unit 14. FIG. 2a shows a waveform of voltage on power supply line L1 of three power supply line L1 to L3 supplying three-phase AC voltage from three-phase AC power supply 28 to converter 10. FIG. 2b shows sinusoidal PWM voltage command 30 determined by the supply voltage shown in FIG. 2a, and triangle wave (PWM carrier) 32 for generating PWM signal whose pulse width changes in accordance with the PWM voltage command signal. When the PWM control is carried out by PWM control unit 14, PWM voltage command signal 30 is compared with triangle wave 32. If PWM voltage command signal 30 is larger than triangle wave 32, transistor 23A is turned off and transistor 23D is turned on. On the other hand, if PWM voltage command 30 is smaller than triangle 32, transistor 23A is turned on and transistor 23D is turned off. Transistors 23B, 23E connected to power supply line L2 and transistors 23C, 23F connected to power supply line L3 are controlled in a similar way as the control of transistor 23A, 23D as stated above.

Figure 2C:
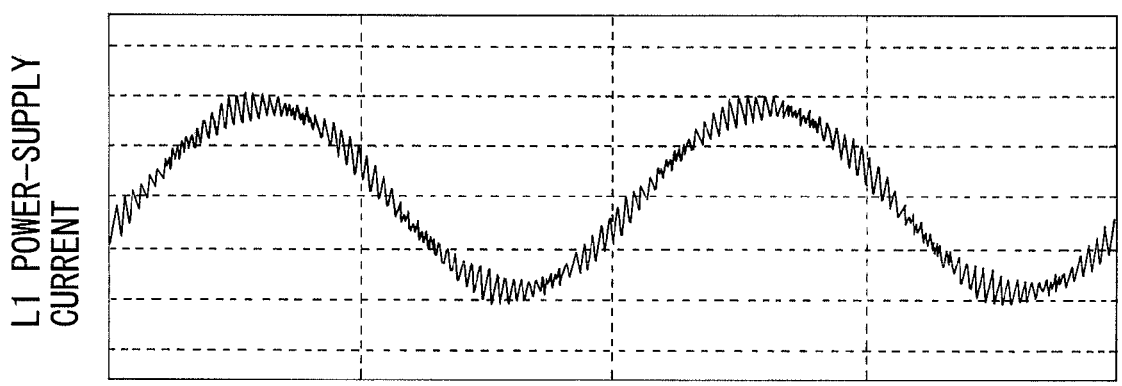

By controlling transistors 23A to 23F as stated above, a waveform of respective currents flowing into power supply lines L1 to L3 becomes a substantially sinusoidal waveform as shown in FIG. 2c. Further, it is possible to control respective DC voltage outputs from converter 10 by changing the amplitude of PWM voltage command signal 30 in accordance with the difference between a voltage of DC link 26 and target value of the voltage of DC link 26. On the other hand, the PWM control has a disadvantage in that the amount of heat generated by the power switching elements, especially, transistors 23A to 23F at the time of power regeneration is relatively large, since the switching of transistor 23A to 23F is frequently carried out.

FIG. 3 is a diagram explaining the power regenerative control of the 120 degree current-carrying system carried out in 120 degree current-carrying control unit 18 at the time of power regeneration. It is possible to determine whether converter 10 is in power regenerative operation or in power running operation by detecting the voltage of DC link 26 connecting converter 22 to an inverter (not shown in figures). FIG. 3a shows a waveform of voltage on power supply line L1, in a same way as shown in FIG. 2a. A voltage having a phase shifted from the phase of the voltage on power supply line L1 by 120 degree, not shown in figures, appears on power supply line L2, and a voltage having a phase shifted from the phase of the voltage on power supply line L1 by 240 degree, not shown in figures, appears on power supply line L3. FIG. 3b shows a control signal which is supplied to transistor 23A. As shown in FIG. 3b, the control signal which is supplied to transistor 23A makes transistor 23A turn on while an electrical potential of power supply line L1 is the highest among three power supply lines L1 to L3. As shown in FIGS. 3a and 3b, the control signal which is supplied to transistor 23B makes transistor 23B turn on while an electrical potential of power supply line L2 is the highest among three power supply lines L1 to L3, and the control signal which is supplied to transistor 23C makes transistor 23C turn on while an electrical potential of power supply line L3 is the highest among three power supply lines L1 to L3.

FIG. 3e shows a control signal which is supplied to transistor 23D. As shown in FIG. 3e, the control signal which is supplied to transistor 23D makes transistor 23D turn on while an electrical potential of power supply line L1 is the lowest among three power supply lines L1 to L3. As shown in columns FIGS. 3f and 3g, the control signal which is supplied to transistor 23B makes transistor 23B turn on while an electrical potential of power supply line L2 is the lowest among three power supply lines L1 to L3, and the control signal which is supplied to transistor 23C makes transistor 23C turn on while an electrical potential of power supply line L3 is the lowest among three power supply lines L1 to L3.

By controlling transistors 23A to 23F at the time of the power regenerative operation as stated above, the respective power regenerative currents is generated in a phase representing the maximum electric potential among the three and a phase representing the minimum electric potential among the three phases. FIG. 3h shows a waveform of current flowing into power supply line L1 at that time. As shown in FIG. 3h, the 120 degree current-carrying system has disadvantages in that there are large harmonics included in the respective input currents to the converter resulting from pulse-like large currents, in that a sudden change of the DC voltage outputs from the converter affects a control of the motor and so on. However, it has an advantage in that the amount of heat generated by the power switching elements is smaller than that in case of the PWM control, since the number of the switching of transistor 23A to 23F is much less than that in case of the PWM control.

Therefore, the motor drive device can continue the operation without stopping the system by selecting the PWM control at the time of normal operation in order to suppress harmonics included in the respective input currents to the converter and changing from the PWM control to the 120 degree current-carrying control when there is an excessive load of the converter caused by the regenerative currents.

Figure 4:
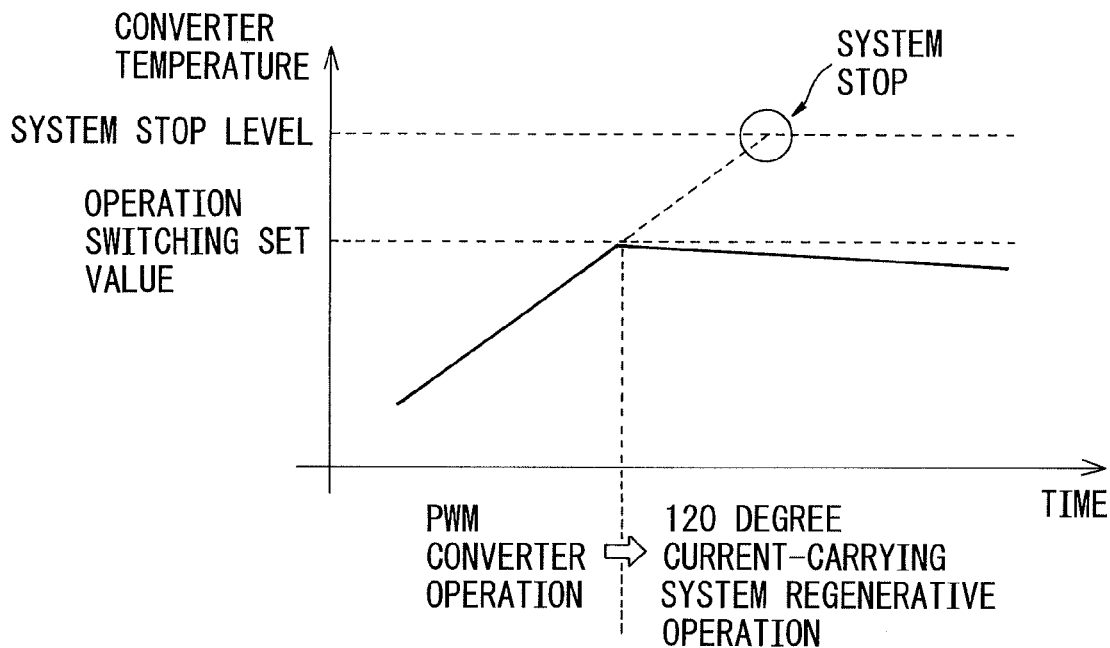
FIG. 4 is a graph explaining an operation of the motor drive device whose operation is continued by switching to the 120 degree current-carrying system.

In the embodiment shown in FIG. 1, the load of the power switching elements is estimated by the temperature detected by temperature detection element 24. As shown in FIG. 4, a system of the motor drive device stops when the temperature reaches a system stop level. However, the motor drive device can continue the operation by switching to the regenerative operation carried out by the 120 degree current-carrying system when the temperature reaches an operation switching set value smaller than the system stop level. Further, it is possible to carry out a switching by an externally supplied signal to the device in place of an automatic switching by regenerative operation switching unit 20.

Figure 5:
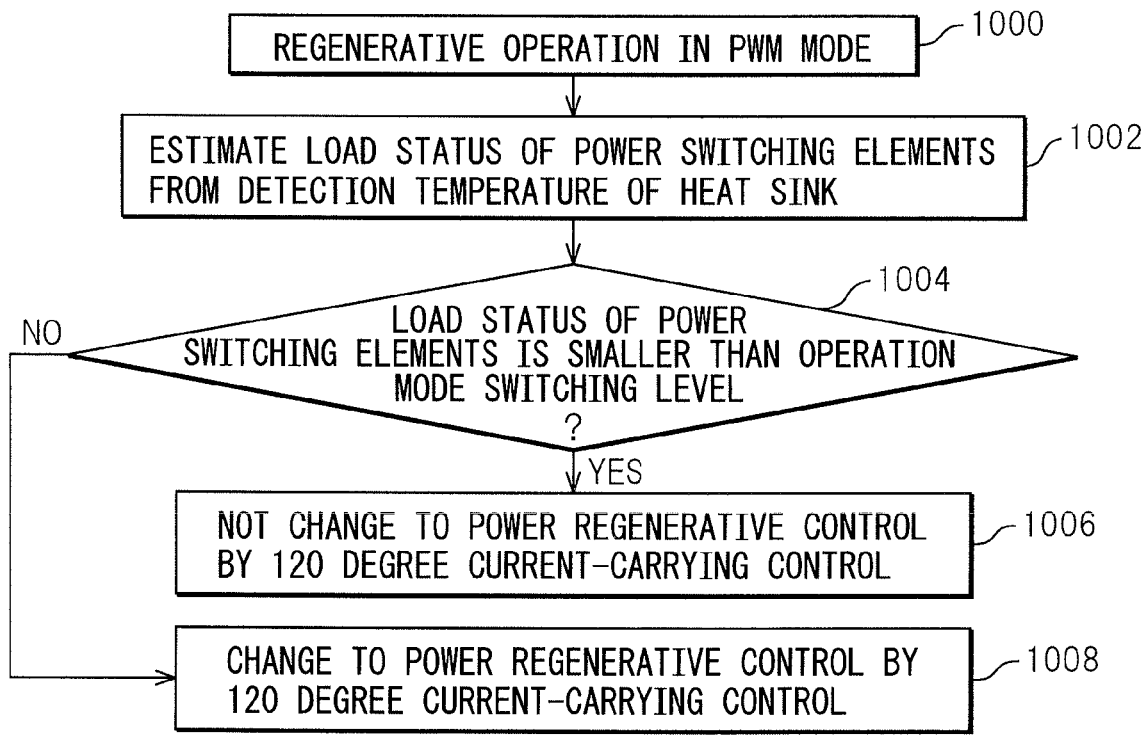
FIG. 5 is a flowchart of an operation of a regenerative operation switching unit shown in FIG. 1.

FIG. 5 is a flowchart showing the operation of regenerative operation switching unit 20 carrying out the control as stated above. As shown in FIG. 5, at the time of the regenerative operation in PWM mode (Step 1000), the load status of the power switching elements is estimated from the temperature detected by temperature detection element 24 which detects the temperature of heat sink 22 (Step 1002). If the load status of the power switching elements is smaller than the operation mode switching level (Yes in Step 1004), the control carried out by the PWM mode is maintained (Step 1006). On the other hand, if the load status of the power switching elements is larger than the operation mode switching level (No in Step 1004), the control carried out by the PWM mode is switched to the power regenerative control carried out by 120 degree current-carrying system (Step 1008).

Figure 6:
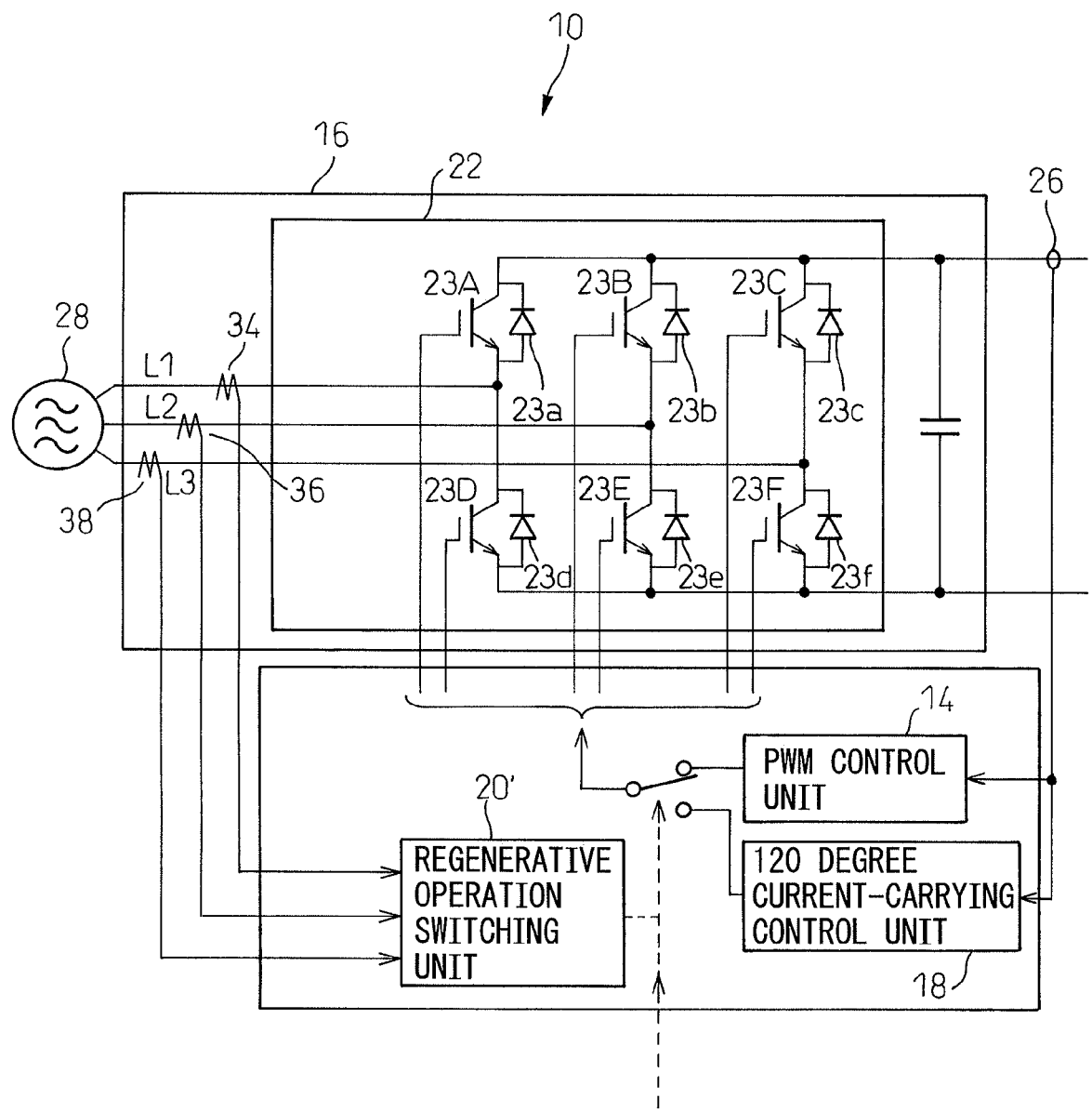
FIG. 6 is a diagram showing a configuration of a motor drive device according to a second embodiment of the present invention.
Figure 7:
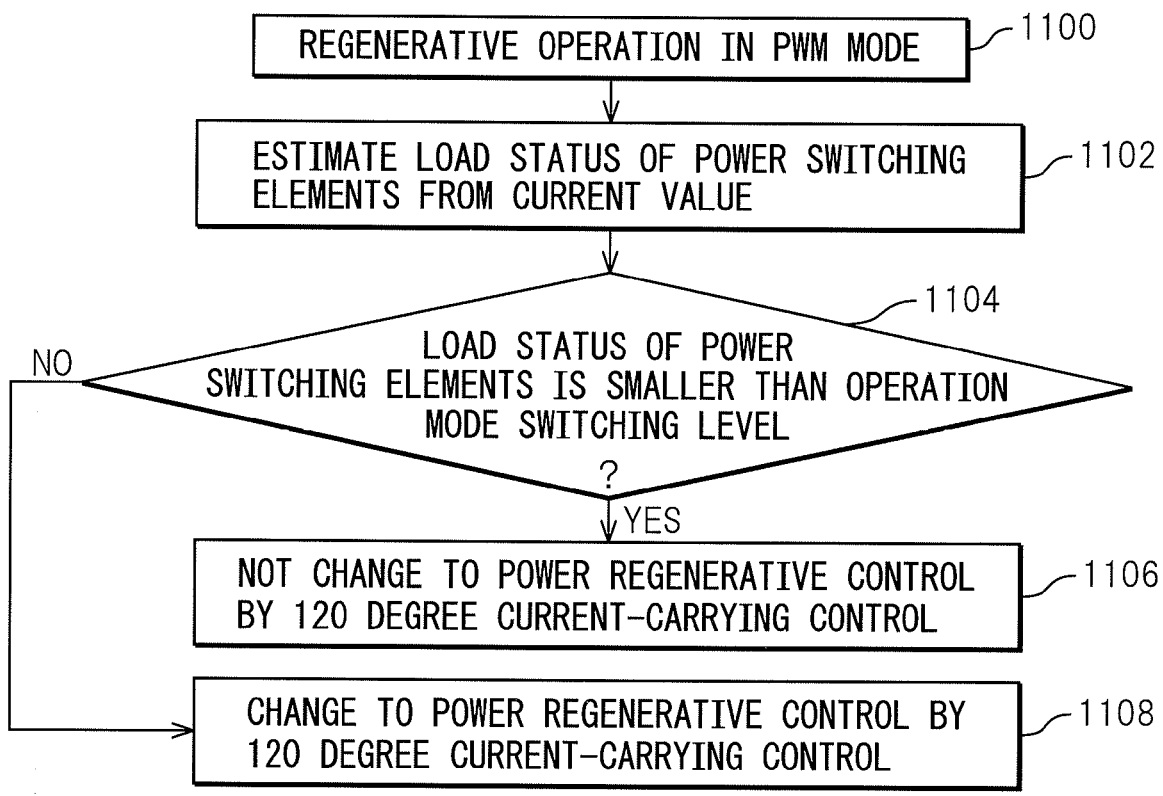
FIG. 7 is a flowchart of an operation of a regenerative operation switching unit shown in FIG. 6.

FIG. 6 is a diagram showing a configuration of a motor drive device according to a second embodiment of the present invention, and FIG. 7 is a flowchart showing the operation of regenerative operation switching unit 20' in the second embodiment.

In the second embodiment, the load status of the power switching elements is estimated by respective current values detected by current sensors 34, 36, 38 provided on power supply lines L1 to L3 instead of estimating the load status of the power switching elements by the temperature detected by current detection element 24 in the first embodiment. That is, for example, if one of the values of currents flowing into the power switching elements, which is determined by currents detected by current sensors 34, 36, 38, is represented by $I_{(n)}$, and estimated value of the load of the power switching elements is represented by $Q_{(n)}$, $Q_{(n)}$ is determined by a recurrence relationship as follows (Step 1102):

$$Q_{(0)} = 0$$

$$Q_{(n)} = a_1 \cdot Q_{(n-1)} + a_2 \cdot I_{(n)}^2 \ (n=1, 2, \ldots)$$

In this case, $a_1$ and $a_2$ are constants ($0 < a_1 < 1$; $0 < a_2$). If the estimated value $Q_{(n)}$ of the load of the power switching elements is smaller than the operation mode switching level (Yes in Step 1104), the control carried out by the PWM mode is maintained (Step 1106). On the other hand, if the estimated value $Q_{(n)}$ of the load of the power switching elements is larger than the operation mode switching level (No in Step 1104), the control carried out by the PWM mode is switched to the power regenerative control carried out by 120 degree current-carrying system (Step 1108).

While the invention has been described with reference to specific preferred embodiments, it will be understood, by those skilled in the art, that various changes or modifications may be made thereto without departing from the scope of the following claims.

The invention claimed is:

1. A motor drive device comprising an AC/DC conversion unit for converting an AC voltage supplied from a power supply into a DC voltage, and a DC/AC conversion unit for converting said DC voltage into an AC voltage with a variable frequency in order to drive a motor, wherein said AC/DC conversion unit has:

rectifier diodes;

transistors respectively connected to said rectifier diodes in parallel and in an inverse direction;

a first power regenerative control unit for controlling said transistors by using a pulse width modulation signal whose pulse width changes in accordance with a value indicated by a command signal;

a second power regenerative control unit for controlling said transistors at the time of carrying out a power regenerative operation for returning energy generated by the motor to said power supply in order to generate respective power regenerative currents in a phase representing the maximum electric potential and a phase representing the minimum electric potential; and a power regenerative operation switching unit for switching a control of said power transistors at the time of carrying out said power regenerative operation between a control carried out by said first power regenerative control unit and a control carried out by said second power regenerative control unit;

said power regenerative operation switching unit selects the control carried out by said first power regenerative control unit while a parameter representing load value of said AC/DC conversion unit at the time of carrying out said power regenerative operation is equal to or less than an operation switching set value smaller than the system stop level, and switches to the control carried out by said second power regenerative control unit when the parameter exceeds said operation switching set value.

2. The motor drive device according to claim 1, wherein said power regenerative operation switching unit carries out the switching in accordance with an externally supplied signal.

3. The motor drive device according to claim 2, wherein said parameter represents a temperature of power elements included in said AC/DC conversion unit or a temperature of a heat sink on which said power elements are provided.

4. The motor drive device according to claim 2, wherein said parameter represents an estimated value of load of said power elements included in said AC/DC converter, determined by respective currents flowing between said power supply and said AC/DC conversion unit.

5. The motor drive device according to claim 1, wherein said parameter represents a temperature of power elements included in said AC/DC conversion unit or a temperature of a heat sink on which said power elements are provided.

6. The motor drive device according to claim 1, wherein said parameter represents an estimated value of load of said power elements included in said AC/DC converter, determined by respective currents flowing between said power supply and said AC/DC conversion unit.

* * * * *